United States Patent
Geber et al.

(10) Patent No.: US 6,548,915 B1
(45) Date of Patent: Apr. 15, 2003

(54) ELECTRONIC IGNITION STARTER SWITCH AND STEERING WHEEL LOCKING APPARATUS

(75) Inventors: Michael Geber, Bad Urach (DE); Adrian Mazzini, Wolpertswende (DE); Joeren-Marten Ohle, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/551,598

(22) Filed: Apr. 17, 2000

(30) Foreign Application Priority Data

Apr. 15, 1999 (DE) .......................................... 199 16 966

(51) Int. Cl.[7] .............................................. B60R 25/04
(52) U.S. Cl. ..................................... 307/10.2; 307/10.6
(58) Field of Search ................................ 307/10.2–10.6

(56) References Cited

U.S. PATENT DOCUMENTS

| | | | | |
|---|---|---|---|---|
| 3,827,526 A | * | 8/1974 | Smith | 307/10 AT |
| 4,250,976 A | * | 2/1981 | Mochida | 307/10 AT |
| 4,638,882 A | * | 1/1987 | Sato | 307/10 AT |
| 5,124,565 A | * | 6/1992 | Yoshida et al. | 307/10.3 |
| 5,136,284 A | * | 8/1992 | Kitamura | 307/10.5 |
| 5,656,867 A | * | 8/1997 | Kokubu | 307/10.5 |
| 5,751,073 A | * | 5/1998 | Ross | 307/10.5 |
| 5,801,614 A | * | 9/1998 | Kokubu | 307/10.2 |
| 5,818,330 A | * | 10/1998 | Schweiger | 307/10.2 |
| 5,965,955 A | * | 10/1999 | Takaohashi | 307/10.5 |
| 5,977,655 A | * | 11/1999 | Anzai | 307/10.3 |
| 6,040,638 A | * | 3/2000 | Howell | 307/10.2 |
| 6,172,430 B1 | * | 1/2001 | Schmitz et al. | 307/10.2 |
| 6,259,168 B1 | * | 7/2001 | Okada | 307/10.5 |

FOREIGN PATENT DOCUMENTS

| | | |
|---|---|---|
| DE | 4434587 A1 | 4/1995 |
| DE | 4446613 A1 | 6/1996 |
| DE | 19634627 C1 | 11/1997 |
| DE | 19741438 C1 | 12/1998 |

* cited by examiner

*Primary Examiner*—Fritz Fleming
(74) *Attorney, Agent, or Firm*—Crowell & Moring LLP

(57) ABSTRACT

An electronic ignition starter switch and steering wheel locking apparatus for a motor vehicle which includes a steering wheel locking unit for locking and unlocking a vehicle steering element, an ignition starter switch unit for switching an engine ignition on and off and for starting the vehicle engine, and a coupling device. The apparatus ensures that the steering wheel locking unit is in its unlocked state during starting of the engine. The coupling device contain state interrogation and starting blocking circuits, which interrogate the locking state of the steering wheel locking unit and allow the engine to be started only when the steering wheel locking unit is in its unlocked state.

9 Claims, 2 Drawing Sheets

ELECTRONIC IGNITION STARTER SWITCH AND STEERING WHEEL LOCKING APPARATUS

BACKGROUND AND SUMMARY OF THE INVENTION

This application claims the priority of German Application No. 19916966.7, filed Apr. 15, 1999, the disclosure of which is expressly incorporated by reference herein.

The invention relates to an electronic ignition starter switch and steering wheel locking apparatus for a motor vehicle, and for passenger cars. Steering wheel locks of this generic type provide an immobilization function in that they keep the steering wheel locked unless the vehicle user has used an appropriate authentication means to verify that he is authorized to drive. The steering wheel locking unit is coupled, via appropriate coupling means, to the ignition starter switch unit, so as to ensure that the steering wheel locking unit is in its unlocked state during starting of the engine.

In an apparatus of this type, the ignition starter switch unit is formed by a mechanical ignition key/ignition lock system, in which the ignition lock can be operated by a key which authorizes driving. In this case, the ignition lock may be rotated, in a known manner, between four positions, namely a "0" position in which the key can be inserted and removed and both the ignition and the vehicle power supply are switched off, a "15R" position in which the vehicle power supply is activated but the ignition is still switched off, a "15" position in which the ignition is switched on and in which the ignition lock is in the normal driving mode, as well as a "50" position, to which the ignition lock is briefly rotated in order to start the engine.

The steering wheel locking unit, including a locking control unit and an actuating unit is supplied via a supply line. The steering wheel locking unit is in the locked state when no power supply is present, and can be changed to its locked state by supplying the necessary operating power. The supply line is routed via a rotatable ignition lock, which acts as a mechanical switching element. In this case, it keeps the supply line closed as long as, after successful key authentication, it has not been rotated through more than a threshold-value angle, which can be predetermined, from its off position so that the steering wheel locking unit can remain in its locked state during this period. When the ignition lock is moved beyond the predetermined threshold-value angle, it interrupts the supply line, thus ensuring that the steering wheel locking unit is in its unlocked state during the subsequent starting of the vehicle engine.

German Patent Specification DE 196 34 627 C1 describes the coupling of a steering wheel locking unit to an electronic immobilizer, in which the steering wheel locking unit has a bolt as an actuating element, whose movement between an unlocked position and a locked position is blocked by means of a blocking device when the electronic immobilizer is armed. When the electronic immobilizer is disarmed, the blocking device releases the bolt, which can then be moved to its unlocked position, for example by the head of a vehicle key, by a separate transponder or by a Bowden cable. Alternatively, the bolt can be operated by rotating an ignition key that has been inserted into an ignition lock, as is known from German Laid-Open Specifications DE 44 34 587 A1 and DE 44 46 613 A1, which are cited in DE 196 34 627 C1.

Purely electronic ignition starter switch units without any mechanical ignition key/ignition lock system are being increasingly used in modern passenger cars, in particular systems without any active key operation, that is to say so-called "keyless-go" systems, in which a closure system and an electronic immobilizer are controlled via wire-free communication by means of an authentication element, for example in the form of a smart card, which for this purpose just needs to be carried by the user, without any further action being required of him. In such systems, the ignition starter switch unit typically does not contain any mechanical key/lock unit, but corresponding push-button switches, to switch the ignition on and off and to start the engine. On the other hand, for these systems, it is also desirable to have the capability to prevent a steering wheel locking unit which is present still accidentally being in its locked state when the vehicle engine is running.

German Patent Specification DE 197 41 438 C1 describes a method and a control system for stopping a motor vehicle, in which the motor vehicle propulsion engine is switched off, and the vehicle speed is detected when the ignition starter switch is switched off; the associated speed sensor then continues to operate at least until it indicates that the vehicle is stationary. Any steering lock that is fitted is then activated only after the sensor identifies that the vehicle is stationary.

One object of the present invention is to provide a relatively simple ignition starter switch and steering wheel locking apparatus, which ensures that the steering wheel locking unit is in its unlocked state when the vehicle engine is running.

This and other objects and advantages are achieved by the ignition starter switch and steering wheel locking apparatus according to the invention, in which the steering wheel locking unit and the ignition starter switch unit are coupled to one another via a coupling means, the latter comprises state interrogation and starting blocking means, which interrogate the locking state of the steering wheel locking unit and allow the vehicle engine to be started only when the steering wheel locking unit is in its unlocked state. The state interrogation and starting blocking means are thus able to interrogate the locking state of the steering wheel locking unit when the vehicle user demands that the engine be started and, following this, to allow the demanded engine start actually to be carried out only if the steering wheel locking unit is in the unlocked state.

This ensures that the steering wheel locking unit is in its unlocked state once the engine has been successfully started and while the vehicle is being driven, without necessarily switching to this state, for example by interrupting a supply line, by the ignition starter switch unit, before the engine is allowed to start. The apparatus is thus suitable not only for traditional driving authorization systems with a mechanical ignition lock, but also for the "keyless-go" systems and other driving authorization systems without any mechanical ignition lock. Furthermore, in the event of a fault in which, although the steering wheel locking unit receives an unlocking command to assume its unlocked state, this control command is acted upon because of a system fault, it is advantageous to block the starting of the engine since the state interrogation identifies that the steering wheel locking unit is incorrectly in the locked state.

In a further development, the state of the steering wheel locking unit is interrogated by an ignition starter control unit in the ignition starter switch unit. This is accomplished by connecting the ignition starter control unit via an appropriate interrogation line to the steering wheel locking unit, specifically to a locking control unit, which drives an associated actuating unit for locking and unlocking the vehicle steering element. Thus, when the vehicle user demands that the engine be started, the ignition starter control unit is actually able to either allow or prevent the starting process, depending on the result of the interrogation of the state of the steering wheel locking unit. If the said control units are used as system components, the only extra item needed is the interrogation line.

In a further refinement, a supply line is provided, by to which the steering wheel locking unit can be supplied with two different power levels. A first, higher power level is chosen such that it is sufficient to supply both the locking control unit and the actuating unit, for example an actuating motor. The second, lower power level is chosen such that, although it is sufficient to operate the locking control unit, it is not sufficient to operate the connected actuating unit. When the second power level is applied to the steering wheel locking unit, its locking control unit functions so that it can be interrogated by the ignition starter control unit to determine the locking state of the steering wheel locking unit. At the same time, the locking actuating unit does not operate owing to the lack of a sufficient power supply which, if a conventional system design is chosen, means that the steering wheel locking unit is in the unlocked state. In order to change the steering wheel locking unit to its locked state, the higher power level is applied to the supply line. In a further refinement the need for a separate interrogation line between the steering wheel locking unit and the ignition starter switch unit has been eliminated, since the supply line for the steering wheel locking unit is routed via the ignition starter switch unit, and at the same time acts as the state interrogation line.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
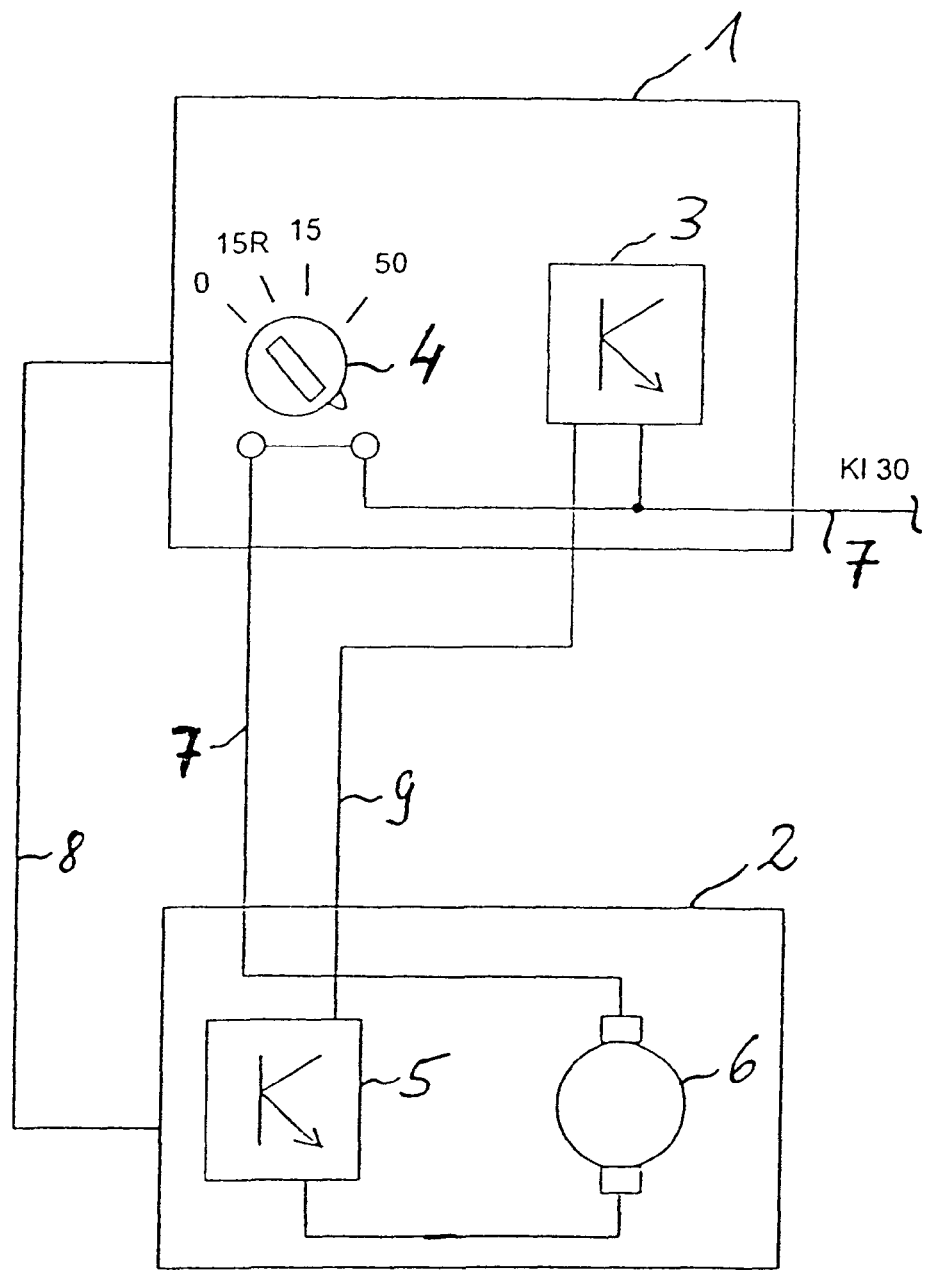
FIG. 1 shows a block diagram of an electronic ignition starter switch and steering wheel locking apparatus having a supply line and a separate interrogation line between the steering wheel locking unit and the ignition starter switch unit.

The electronic ignition starter switch and steering wheel locking apparatus shown schematically as a block diagram in FIG. 1 contains an ignition starter switch unit 1 coupled to steering wheel locking unit 2. The ignition starter switch unit 1 includes an ignition starter control unit 3, which is formed by a microcontroller, and a mechanical ignition lock 4, which can be rotated in the conventional manner, after insertion of an authorized key between the four ignition lock positions "0", "15R", "15" and "50" whereby the ignition and vehicle power supply are switched off in the "0" position as the initial position, the ignition is still switched off but the rest of the vehicle power supply is switched on in the "15R" position, the so-called "radio position", the ignition is switched on in the "15" position, and the ignition lock temporarily assumes the "50" position in order to start the engine. The ignition starter switch unit 1, in particular its ignition starter control unit 3, is supplied from the vehicle power supply via the supplied, standardized "terminal 30" line 7.

The steering wheel locking unit 2 includes an associated locking control unit 5, which is in turn formed by a microcontroller, and an actuating motor 6 which is driven by said microcontroller and has an associated actuating element (not shown) which can be moved by the actuating motor 6 between a locked position and an unlocked position, respectively, which block or release the steering wheel or an equivalent vehicle steering element. For supplying power, the "terminal 30" line 7 is routed from the ignition starter switch unit 1, via its ignition lock 4, to the steering wheel locking unit 2, and specifically also to the actuating motor 6 there. The supply line 7 is not interrupted by the ignition lock 4, irrespective of its position, so that the steering wheel locking unit 2 and, specifically, its locking control unit 5 as well are supplied with the necessary operating power from the vehicle power supply whatever the position of the ignition lock 4. A data line 8 connects the steering wheel locking unit 2 and the ignition starter switch unit 1, for example in the form of a vehicle data bus, in order to allow data communication processes to be carried out with these two units 1, 2.

A characteristic of the exemplary embodiment in FIG. 1 is the presence of a separate interrogation line 9 between the ignition starter control unit 3 and the locking control unit 5. The ignition starter control unit 3 uses the interrogation line 9 to interrogate the locking control unit 5 for the state of the steering wheel locking unit 2, that is to say whether this unit is in its locked or unlocked state. The interrogation of the locking state of the steering wheel locking unit 2 is carried out in particular by the ignition starter control unit 3 when an engine starting demand is identified thus, overall, typically resulting in the following functional sequence for starting the vehicle.

First of all, the vehicle user inserts an authorizing key into the ignition lock 4, which is shown in its initial position, and then successively rotates this key to the "15R" position for vehicle power supply activation and to the "15" position to switch on the ignition for the vehicle engine. He then makes an engine starting demand by rotating the ignition lock 4 further to the "50" position, which is identified by the ignition starter control unit 3. At this time this control unit interrogates the locking control unit 5, via the interrogation line 9, to determine the locking state of the steering wheel locking unit 2. When no faults are present, the locking control unit 5 will have already received information in good time that a vehicle starting process is taking place and, in particular, that the engine ignition is switched on and that an engine starting demand may have been made. This information can be supplied to the locking control unit 5, for example from the ignition starter switch unit 1 via the data line 8. The locking control unit 5 will then, accordingly, have moved the actuating motor 6 to the unlocked position, which is desired in order to start the vehicle. In the event of a malfunction in the steering wheel locking unit 2, however, there is no assurance that it will actually also assume the desired unlocked state in this situation. On the other hand, this should avoid the steering wheel locking unit 2 still being in its locked state during starting of the vehicle engine.

When an engine starting demand is made, the ignition starter control unit 3 uses the corresponding interrogation to determine whether the steering wheel locking unit has assumed the desired unlocked state. If this is the case, the ignition starter control unit 3 allows the engine to be started. If, on the other hand, it identifies via the interrogation line 9 that the steering wheel locking unit 2 is still in the locked state, then it prevents the demanded starting of the vehicle engine. Since successful starting of the vehicle engine is thus linked to the interrogated condition that the steering wheel locking unit 2 is in its unlocked position, this ensures that the engine is successfully started only if the steering wheel locking unit 2 has assumed this state.

Figure 2:
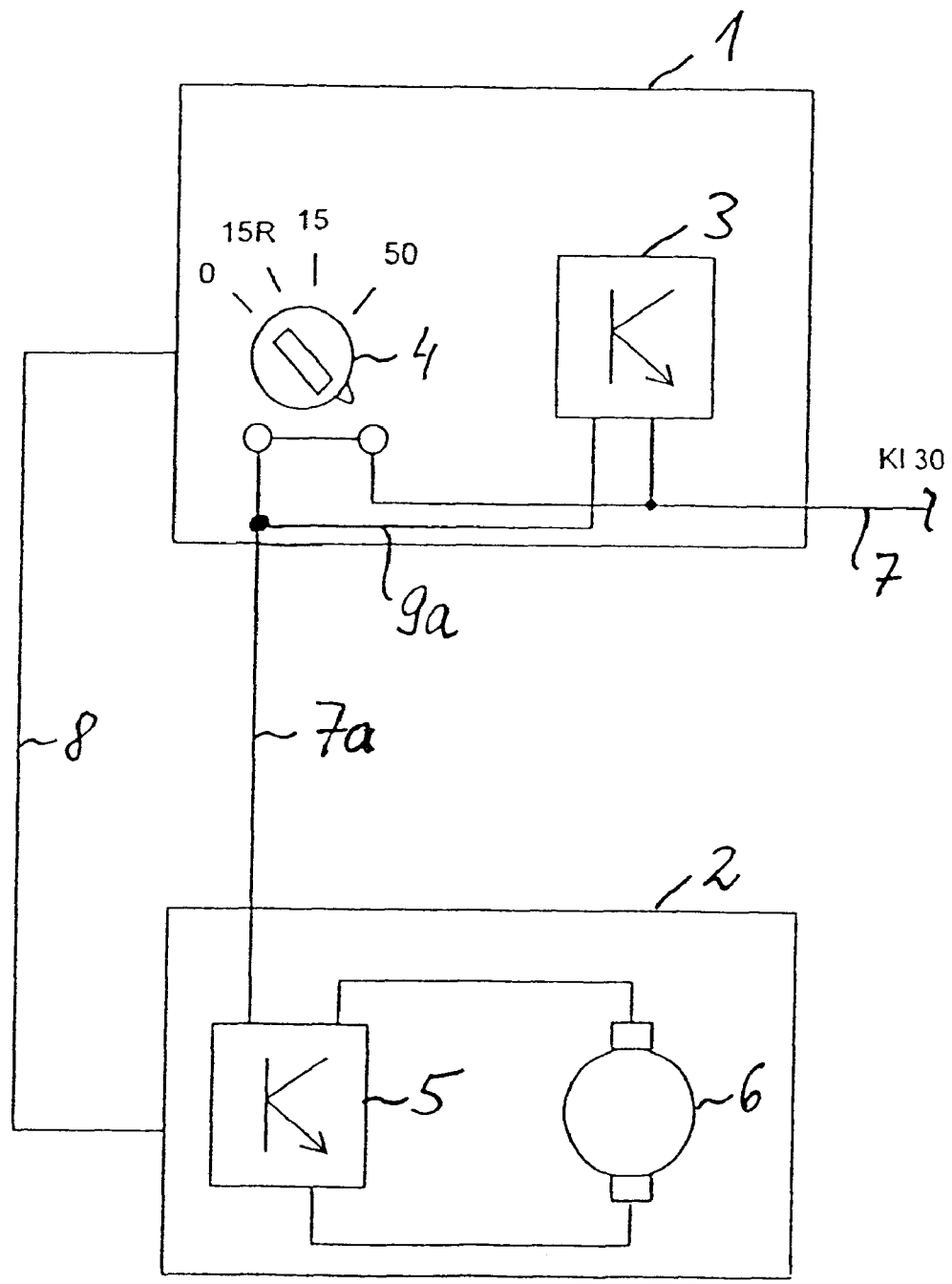
FIG. 2 shows a block diagram of an electronic ignition starter switch and steering wheel locking apparatus with a combined supply and interrogation line between the steering wheel locking unit and the ignition starter switch unit.

FIG. 2 shows, schematically, a further ignition starter switch and steering wheel locking apparatus as a variant of that in FIG. 1, with functionally corresponding elements being provided with the same reference symbols, for the sake of simplicity, and, to this extent, reference may be made to the above description relating to FIG. 1. In particular, the apparatus in FIG. 2 also contains the ignition starter switch unit 1 with the associated microcontroller control unit 3 and mechanical ignition lock 4 as well as the steering wheel locking unit 2 with the associated control unit 5 and the actuating motor 6 which is driven by it. As in FIG. 1, the data line 8 is provided between the ignition starter switch unit 1 and the steering wheel locking unit 2.

The characteristic difference between the apparatus in FIG. 2 and that in FIG. 1 is that the supply and interrogation line between the ignition starter switch unit 1 and the steering wheel locking unit 2 are not separate, but are provided in combined form. Furthermore, the ignition lock exerts a current-limiting function on the steering wheel locking unit. To this end, the ignition lock 4 actively engages in the incoming "terminal 30" of line 7. That is, depending on the position, it no longer allows all of the vehicle supply power that is present on line 7 to be passed to the steering wheel locking unit 2. A combined supply and interrogation line 7a is routed from the ignition lock 4 to the locking control unit 5. The ignition starter control unit 3 is connected to line 7a, via an interrogation line branch 9a, inside the ignition starter switch unit 1. In this example, the power supply for the actuating motor 6 passes through the locking control unit 5 within the steering wheel locking unit 2.

The current-limiting function of the ignition lock 4 is chosen such that all the vehicle power, which arrives via the "terminal 30" line 7 or via the combined supply and interrogation line 7a, is fed to the steering wheel locking unit 2 only for as long as the rotation position of the ignition lock is in such a position that the ignition is switched off. To this end, for example, it is possible to provide a threshold-value angle, which is located between the initial position and the position "15" for switching on the ignition, up to which the ignition lock 4 passes all the vehicle power once said ignition lock 4 is rotated from its initial position. When it moves beyond the threshold-value angle or when it has in any case reached the "15" position where the ignition is switched on, a circuit, which is normally used for this purpose and is known as such to a person skilled in the art, ensures that the ignition lock 4 limits the current for the supply line 7a and, in this way, now allows only a reduced operating power level for the steering wheel locking unit 2 to pass via the combined supply and interrogation line 7a. This reduced power level is chosen such that, although the locking control unit 5 can still be kept in operation, it is, however, not sufficient to activate the actuating motor 6. Since the locking control unit 5 thus continues to be operational, it can successfully be interrogated for the locking state of the steering wheel locking unit 2 by the ignition starter control unit 3, likewise using the combined supply and interrogation line 7a, to which the ignition starter control unit 3 has access via the interrogation line branch 9a.

The steering wheel locking unit 2 is preferably designed is the usual manner so that it is in its unlocked state when the actuating motor 6 is switched off and deactivated. When the ignition lock 4 reaches the "15" position for switching on the ignition, or in any case at the latest the "50" position to demand engine starting, the operating power for the steering wheel locking unit 2 is limited to such an extent that its actuating motor 6 remains deactivated. Therefore, when no faults are present, the steering wheel locking unit 2 assuming its unlocked state, as desired. Even if the unlocking does not occur due to a malfunction, the ignition starter control unit 3 identifies the unlocked state by means of the locking state interrogation, and prevents the engine from starting.

In comparison with the example in FIG. 1, the apparatus in FIG. 2 has the advantage that, apart from the data line 8, only one further connecting line is required, in the form of the combined supply and interrogation line 7a between the ignition starter switch unit 1 and the steering wheel locking unit 2. Aside from this difference, the apparatus shown in FIG. 2 has the same functions and advantages as those described above for the example in FIG. 1. Although the two illustrated examples relate to systems with a mechanical ignition lock, it is evident from the above description that this is not an essential component of the apparatus according to the invention. In particular, the apparatus according to the invention is also suitable for "keyless-go" systems, which have corresponding functional positions, for example, a plurality of push-buttons or other on/off switching elements. In the case of FIG. 2, it is then just necessary to ensure that the current-limiting devices for reducing the operating power for the steering wheel locking unit are activated whenever the ignition is switched on and/or engine starting is demanded via the appropriate switching element.

Furthermore, in vehicles with automatic transmissions, the apparatus according to the invention makes it possible to ensure that it is possible to start the engine in the "P" and "N" transmission positions, for which purpose the steering wheel locking unit still has to be supplied with power in the "N" transmission position. This can be achieved by the apparatus according to the invention since, in this case, the locking control unit 5 can be supplied with power, and the locking state of the steering wheel locking unit 2 can be interrogated, irrespective of the actuating unit 6 that is driven by the locking control unit 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic ignition starter switch and steering wheel locking mechanism for a motor vehicle, comprising:

a steering wheel locking unit for locking and unlocking a vehicle steering wheel of said vehicle, said steering wheel locking unit including a locking control unit, an ignition starter switch unit including a switching device for switching vehicle engine ignition on and off, and for starting an engine of said vehicle; and wherein said locking control unit is directly coupled to said ignition starter switch unit for unlocking the steering wheel during starting of said engine by said switching device, said locking control unit controlling the operation of said switching device as a function of a state of said steering wheel locking unit;

wherein the vehicle engine is started by said switching device only when the steering wheel locking unit is in an unlocked state.

2. The electronic ignition starter switch and steering wheel locking apparatus according to claim 1, wherein:

said steering wheel locking unit includes an actuating unit;

the ignition starter switch unit includes an ignition starter control unit connected to said locking control unit by an interrogation line for interrogating the locking state of the steering wheel locking unit, whereby the engine is started only when the steering wheel locking unit is in its unlocked state.

3. The electronic ignition starter switch and steering wheel locking apparatus according to claim 2, further including a supply line for supplying power to the steering wheel locking unit wherein said supply line has a first operating power level for supplying both the locking control unit and the actuating unit, when the ignition starter switch is in the state with the ignition switched off, and wherein said supply line has a second operating power level, which is less than the first operating power level for supplying the locking control unit when the ignition starter switch unit is on.

4. The electronic ignition starter switch and steering wheel locking apparatus according to claim 3, wherein:

said supply line is fed to the ignition starter switch unit; and said supply line functions as the interrogation line by which the ignition starter control unit interrogates the locking state of the steering wheel locking unit.

5. The electronic ignition starter switch and steering wheel locking mechanism according to claim 1, further including a data line connection between said steering wheel locking unit and said ignition starter switch in order to provide data communication.

6. An electronic ignition starter control mechanism for a motor vehicle, comprising:

a steering wheel lock for locking and unlocking a steering element;

an ignition starter switch unit having first switching positions for switching vehicle engine ignition on and off and a second switching position for starting the engine; and means, connected between said steering wheel lock and said ignition starter switch unit, for enabling starting of the vehicle engine only when the steering wheel locking unit is in its unlocked state, enabling starting includes an interrogation unit which interrogates the locked state of the steering wheel lock and a blocking unit which blocks starting of the engine when the steering wheel lock is in its locked state wherein:

the steering wheel lock has a locking control unit and an actuating unit;

the blocking unit includes an ignition starter control unit connected directly to the locking control unit through an interrogation line for interrogating the locking state of the steering wheel locking unit, whereby engine starting is enabled only when the steering wheel locking unit is in its unlocked state.

7. The electronic ignition starter control mechanism according to claim 6 further including a supply line for supplying power to the steering wheel lock, and wherein:

said supply line has a first operating power level for supplying both the lock and the actuating unit when the ignition starter switch unit is off; and said supply line supplies a second operating power level lower than first operating power level to said locking control unit when the ignition starter switch is on.

8. The electronic ignition starter control mechanism according to claim 7, wherein:

the supply line is routed to the ignition starter switch unit; and said supply line forms the interrogation unit whereby the ignition starter control unit interrogates the locking state of the steering wheel lock.

9. The electronic ignition starter control mechanism according to claim 6, further including a data line connection between said ignition starter switch unit and said steering wheel lock.

* * * * *